(12) United States Patent
Donovan

(10) Patent No.: US 10,252,474 B2
(45) Date of Patent: Apr. 9, 2019

(54) TEMPERATURE DETERMINATION BASED ON EMISSIVITY

(71) Applicant: HEWLETT-PACKARD DEVELOPMENT COMPANY, L.P., Houston, TX (US)

(72) Inventor: David H. Donovan, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 293 days.

(21) Appl. No.: 15/111,752

(22) PCT Filed: May 30, 2014

(86) PCT No.: PCT/US2014/040212
§ 371 (c)(1),
(2) Date: Jul. 14, 2016

(87) PCT Pub. No.: WO2015/108560
PCT Pub. Date: Jul. 23, 2015

(65) Prior Publication Data
US 2016/0339642 A1    Nov. 24, 2016

(30) Foreign Application Priority Data

Jan. 16, 2014  (WO) ................. PCT/EP2014/050841
Mar. 31, 2014  (WO) ................ PCT/US2014/032341

(51) Int. Cl.
*B29C 67/00*    (2017.01)
*G01J 5/00*    (2006.01)
(Continued)

(52) U.S. Cl.
CPC ........ *B29C 67/0088* (2013.01); *B29C 64/165* (2017.08); *B29C 64/386* (2017.08);
(Continued)

(58) Field of Classification Search
CPC ......... B33Y 30/00; B33Y 50/02; B33Y 10/00; B29C 64/386; B29C 64/00; B29C 64/40; B29C 67/0081; B29C 67/0088
(Continued)

(56) References Cited

U.S. PATENT DOCUMENTS 4,120,630 A    10/1978  Laspisa et al.
4,579,461 A *  4/1986   Rudolph .................. G01J 5/60
                                                       250/340
(Continued)

FOREIGN PATENT DOCUMENTS

CN    1789928      6/2006
CN    102186653    9/2011
(Continued)

OTHER PUBLICATIONS

Dressler, M. et at., Temperature Distribution in Powder Beds During 3D Printing, Rapid Prototyping Journal, 2010, vol. 16, No. 5 , pp. 328-336.
(Continued)

*Primary Examiner* — Yaritza Guadalupe
(74) *Attorney, Agent, or Firm* — HP Inc. Patent Department

(57) ABSTRACT

An additive manufacturing system may include a controller to determine an emissivity of a portion of a layer of build material based on a measured optical property of the portion, or based on object design data representing a degree of intended solidification of the portion. The controller may be to determine a temperature of the portion based on the determined emissivity and a measured radiation distribution emitted by the portion.

19 Claims, 6 Drawing Sheets

(51) Int. Cl.
*G01J 1/02* (2006.01)
*B29C 64/165* (2017.01)
*B29C 64/386* (2017.01)
*B33Y 30/00* (2015.01)
*B33Y 50/02* (2015.01)
*B29K 105/00* (2006.01)

(52) U.S. Cl.
CPC ........... *G01J 1/0242* (2013.01); *G01J 5/0003* (2013.01); *B29K 2105/251* (2013.01); *B33Y 30/00* (2014.12); *B33Y 50/02* (2014.12)

(58) Field of Classification Search
USPC ........................................................ 374/121
See application file for complete search history.

(56) References Cited

U.S. PATENT DOCUMENTS

| | | | |
|---|---|---|---|
| 4,956,538 A | 9/1990 | Moslehi | |
| 5,156,461 A | 10/1992 | Moslehi et al. | |
| 5,460,451 A | 10/1995 | Wadman | |
| 5,508,489 A | 4/1996 | Benda et al. | |
| 5,690,430 A * | 11/1997 | Rudolph | G01J 5/60 |
| | | | 250/338.3 |
| 6,600,129 B2 | 7/2003 | Shen et al. | |
| 6,799,959 B1 | 10/2004 | Tochimoto et al. | |
| 6,930,278 B1 | 8/2005 | Chung et al. | |
| 7,515,986 B2 | 4/2009 | Huskamp | |
| 8,137,739 B2 | 3/2012 | Philippi et al. | |
| 2004/0200816 A1 | 10/2004 | Chung et al. | |
| 2006/0249884 A1 | 11/2006 | Partanen | |
| 2009/0152771 A1 | 6/2009 | Philippi et al. | |
| 2009/0206065 A1 | 8/2009 | Kruth et al. | |
| 2010/0256945 A1 | 10/2010 | Murata | |
| 2011/0032301 A1 | 2/2011 | Fienup | |
| 2012/0231175 A1 | 9/2012 | Tan | |
| 2014/0291480 A1 * | 10/2014 | Bruder | G01C 3/06 |
| | | | 250/206 |
| 2015/0044383 A1 * | 2/2015 | Kim | C09K 5/14 |
| | | | 427/427.4 |
| 2016/0185040 A1 * | 6/2016 | Costlow | B29C 67/0055 |
| | | | 264/40.5 |
| 2016/0325496 A1 * | 11/2016 | De Pena | B29C 67/0081 |
| 2016/0339642 A1 * | 11/2016 | Donovan | B29C 67/0088 |
| 2017/0297095 A1 * | 10/2017 | Zalameda | B22D 23/003 |
| 2018/0017679 A1 * | 1/2018 | Valouch | A63F 13/213 |

FOREIGN PATENT DOCUMENTS

| | | |
|---|---|---|
| CN | 10338880 | 10/2013 |
| EP | 1452298 | 9/2004 |
| EP | 1634694 | 3/2006 |
| JP | 2010-090350 | 4/2010 |
| JP | 2011-099023 | 5/2011 |
| WO | WO-2006091842 | 8/2006 |
| WO | WO-2008151063 | 12/2008 |
| WO | WO-2013030064 | 3/2013 |

OTHER PUBLICATIONS

European Patent Office, International Search Report for PCT/EP2014/050841 dated Sep. 25, 2014 (4 pages).
Korean Intellectual Property Office, International Search Report and Written Opinion for PCT/US2014/040212 dated Oct. 16, 2014 (11 pages).
Korean Intellectual Property Office, International Search Report for PCT/US2014/032341 dated Oct. 13, 2014 (3 pages).
UK Intellectual Property Office, Examination Report for GB1612116.2 dated Jul. 10, 2017 (8 pages).
UK Intellectual Property Office, Examination Report for GB1612116.2 dated Sep. 20, 2018 (9 pages).
UK Intellectual Property Office, Examination Report for GB1612116.2 dated Jul. 26, 2018 (10 pages).
UK Intellectual Property Office, Examination Report for GB1612116.2 dated Nov. 7, 2017 (8 pages).
UK Intellectual Property Office, Examination Report for GB1809984.6 dated Jul. 26, 2018 (16 pages).

* cited by examiner

TEMPERATURE DETERMINATION BASED ON EMISSIVITY

RELATED APPLICATIONS

This application claims priority to PCT Application No. PCT/US2014/032341 filed on Mar. 31, 2014, entitled "GENERATING THREE-DIMENSIONAL OBJECTS", the entire contents of which are hereby incorporated herein by reference, and which itself claims priority to PCT Application No. PCT/EP2014/050841 filed on Jan. 16, 2014, entitled "GENERATING A THREE-DIMENSIONAL OBJECT", the entire contents of which are hereby incorporated herein by reference.

BACKGROUND

Additive manufacturing systems that generate three-dimensional objects on a layer-by-layer basis have been proposed as a potentially convenient way to produce three-dimensional objects in small quantities. The quality of objects produced by such systems may vary widely depending on the type of additive manufacturing technology used.

BRIEF DESCRIPTION

Some examples are described with respect to the following figures.

DETAILED DESCRIPTION

Figure 1:
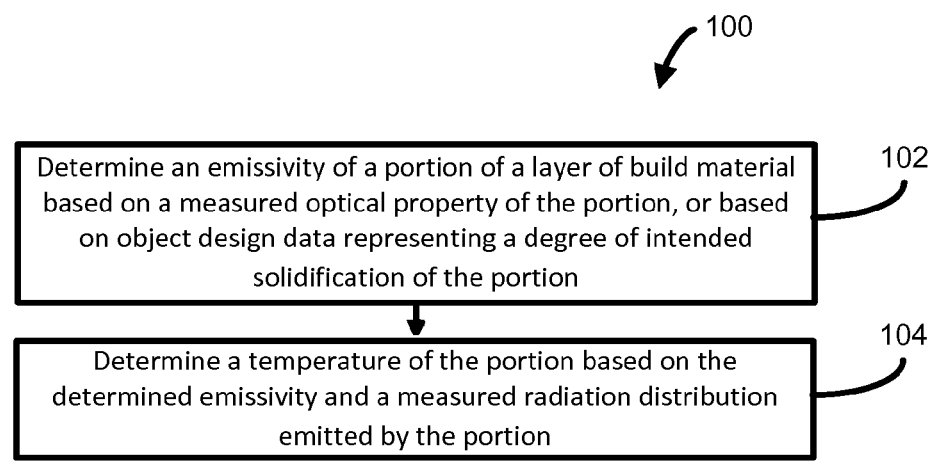
FIG. 1 is a flow diagram illustrating a method of determining temperature according to some examples.

The following terminology is understood to mean the following when recited by the specification or the claims. The singular forms "a," "an," and "the" mean "one or more." The terms "including" and "having" are intended to have the same inclusive meaning as the term "comprising."

Using an additive manufacturing system, a three-dimensional object may be generated through the solidification of portions of one or more successive layers of build material. The build material can, for example, be powder-based or be a liquid, and the properties of generated objects may be dependent on the type of build material and the type of solidification mechanism used. In some examples, solidification may be achieved using a liquid binder agent to chemically solidify build material. In other examples, solidification may be achieved by temporary application of energy to the build material. This may, for example, involve use of a coalescing agent, which is a material that, when a suitable amount of energy is applied to a combination of build material and coalescing agent, may cause the build material to coalesce and solidify. In other examples, other methods of solidification may be used.

Desired object properties, including but not limited to surface roughness, accuracy e.g. existence of deformations, and strength, may depend on the nature of the build materials used, the processes by which build material is solidified to form a desired three-dimensional object, and temperatures of build materials during such processes. Thus, for example, poor object properties may result if temperature of build material is not precisely regulated during the build process. For example, in an effect called coalescence bleed, some portions of build material may achieve undesirable high temperatures sufficient to cause softening, bonding, and subsequent un-intended solidification of build material, resulting in deformations. Deformations may extend laterally from the sides of the object, or below from the bottom of the object. Deformations may also include smaller irregularities in solidification due to undesired temperature distributions or heat conduction effects across the build material. Moreover, spatial or temporal temperature gradients in the build material may decrease object accuracy through inhomogeneous contraction of the object because, for example, some build materials may be optimally processed in very narrow temperature windows.

Accordingly, the present disclosure allows accurate temperature measurements of the build material during the build process to allow temperature to be precisely regulated during the build process, such that build material may be maintained in an optimal temperature window. Thus, desired object properties and control of the generation of the three-dimensional object may be achieved, including reduction of deformations, control of mechanical properties, and consistency when generating objects built at different times. Moreover, a greater variety of materials may be used because materials having narrow temperature windows for optimal processing may still be useable.

Temperature of the build material may be determined accurately as follows. A temperature sensor may measure a spectrum of infra-red (IR) radiation emitted by a portion of the build material. Additionally, emissivity of the portion of the build material may be determined. The emissivity of a material for a given wavelength is the relative ability of its surface to emit energy at that wavelength. The emissivity may be any percentage up to 100%. An emissivity of 50% corresponds to a material having a given temperature and emitting half the amount of energy emitted by an ideal black body at that same temperature. Generally, emissivity may, for example, depend on the type of material, the material's chemical composition, surface characteristics such as degree of roughness, material geometry such as thickness of the material layer, and other factors. The emissivity is generally proportional to its absorptivity. Thus, emissivity of build material may also depend on whether the build material has (1) coalesced and solidified, or is coalescing, or (2) has not coalesced and solidified. Some types of build material may exhibit lesser emissivity when coalesced and solidified relative to when they have not coalesced. However, other build materials may exhibit greater emissivity upon coalescence and solidification.

A material with 100% emissivity may emit a black body distribution, which is based solely on the temperature of the emitting material. However, realistic materials, including build materials, may have less than 100% emissivity, thus the radiant distribution may not be a perfect black body, and the radiation distribution may be based on both temperature and emissivity. Thus, the measured radiant spectrum and the determined emissivity may be used to accurately determine the temperature of build materials, even if they have less than 100% emissivity.

The emissivity of the portion of build material may be determined in various ways. In some examples, emissivity values of the type of build material may be known for each of the phases of the build material, such as different degrees of solidification, for example. In other examples, such as if the type of build material is unknown, emissivity of one or more phases of the build material may be measured before starting the build process.

Then, during the build process, the degree of solidification of the portion of the build material may be determined, which may in turn be used to determine the emissivity based on the known relationship between emissivity values and the degree of solidification of the build material. In some examples, the degree of solidification of the portion of the build material may be determined using object design data defining a model of the object to be generated, or using agent delivery control data defining delivery regions where coalescing agent is to be delivered. In other examples, the degree of solidification may be determined by measuring optical properties, such as absorbance or gloss, from the build material. "Absorbance", also known as "optical density", is a ratio between radiation falling on a material and radiation transmitted through the material or reflected by the material. The absorbance may be calculated according to the formula:

$$\text{absorbance} = -\log\left(\frac{\text{light reflected}}{\text{light impinging}}\right).$$

"Gloss" is an optical property of a surface to reflect radiation in a specular, i.e. mirror-like, direction. The absorbance and gloss measurements may also, in some examples, be generally unaffected by changes in temperature or thermal properties of the build material throughout the build. Optical properties other than absorbance or gloss may be used as well.

FIG. 1 is a flow diagram illustrating a method 100 of generating a three-dimensional object according to some examples. The method 100 may, for example, be implemented by an additive manufacturing system comprising a controller. At 102, the controller may determine an emissivity of a portion of a layer of build material based on a measured optical property of the portion, or based on object design data representing a degree of intended solidification of the portion. At 104, the controller may determine a temperature of the portion based on the determined emissivity and a measured radiation distribution emitted by the portion.

Figure 2A:
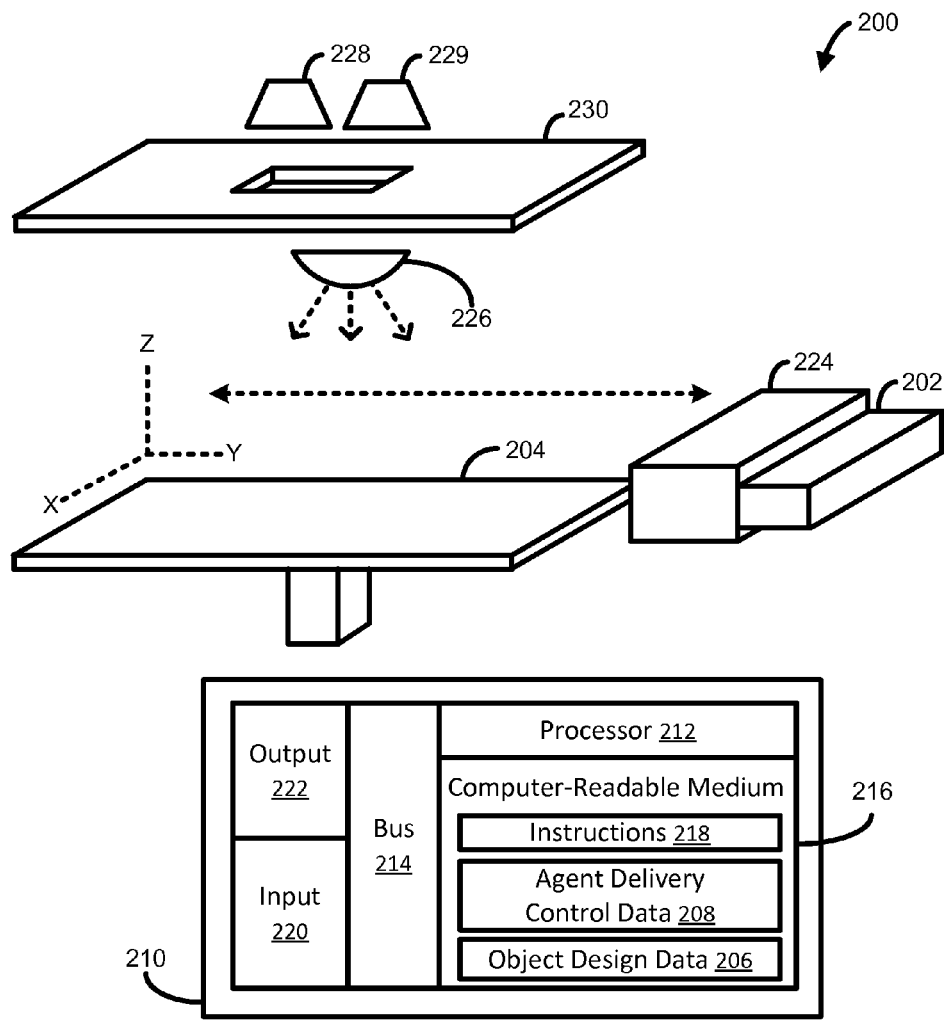
FIG. 2a is a simplified isometric illustration of an additive manufacturing system according to some examples.
Figure 3:
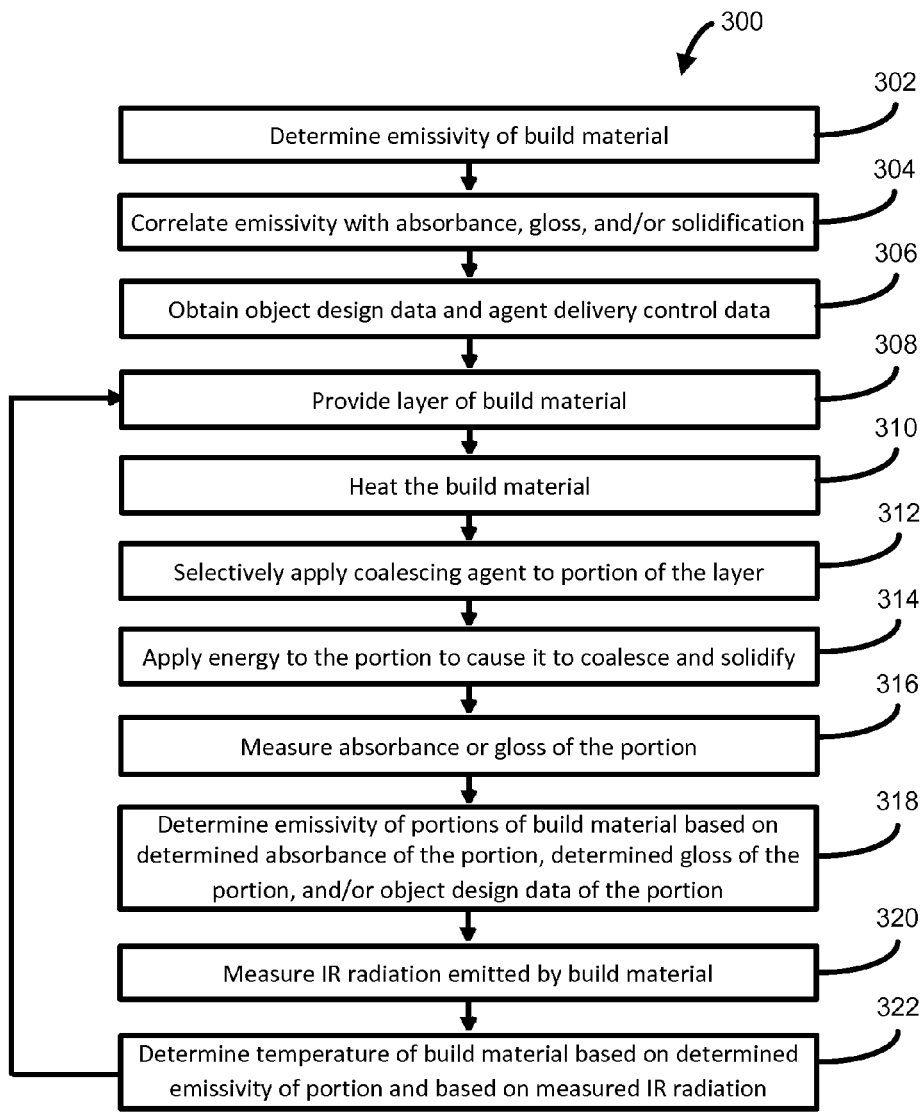
FIG. 3 is a flow diagram illustrating a method of generating a three-dimensional object according to some examples.

FIG. 2a is a simplified isometric illustration of an additive manufacturing system 200 according to some examples. The system 200 may be operated, as described further below with reference to the flow diagrams of FIG. 3 to generate a three-dimensional object.

In some examples the build material may be a powder-based build material. As used herein the term powder-based materials is intended to encompass both dry and wet powder-based materials, particulate materials, and granular materials. In some examples, the build material may include a mixture of air and solid polymer particles, for example at a ratio of about 40% air and about 60% solid polymer particles. One suitable material may be Nylon 12, which is available, for example, from Sigma-Aldrich Co. LLC. Another suitable Nylon 12 material may be PA 2200 which is available from Electro Optical Systems EOS GmbH. Other examples of suitable build materials may include, for example, powdered metal materials, powdered composite materials, powdered ceramic materials, powdered glass materials, powdered resin material, powdered polymer materials, and the like, and combinations thereof. It should be understood, however, that the examples described herein are not limited to powder-based materials or to any of the materials listed above. In other examples the build material may be in the form of a paste, liquid or a gel. According to one example a suitable build material may be a powdered semi-crystalline thermoplastic material.

In some examples, many of the build materials above, such as powders, may exhibit different optical properties, such as different absorbance and different gloss, depending on the degree of solidification of build material, such as whether the build material is or is not solidified. This may allow determining, based on measured optical properties, whether build material has solidified as intended. Degree of solidification may be related to a number of other object properties, including density, strength, elastic modulus, and mechanical performance such as the degree of elongation the object can sustain without breaking. Thus, based on measured optical properties, the degree of each of these object properties may also be determined. For example, the degree of absorbance and the degree of gloss may each be positively correlated with each of the foregoing object properties.

In some examples, if the build material is not solidified, then it may exhibit little or no absorbance and little or no gloss in the presence of a suitable radiation source that emits radiation to the build material. These optical properties may result because of opacity resulting from scattering of radiation between parts of an irregular surface of the build material and between the large number of interfaces between the build material and air, such as between a powder's particles and air voids throughout the powder. If the build material is solidified, then it may exhibit greater absorbance and greater gloss relative to a non-solidified build material. Greater absorbance may result because of greater transparency to radiation e.g. infra-red radiation, for example due to reduced scattering of radiation, causing the radiation to travel deeper into the build material and become absorbed therein, causing the solidified area to look darker. Greater gloss may result, for example, because the build material may have a smoother surface than prior to solidification.

In some examples, coalescing agent is delivered to build material, after which the build material having the coalescing agent is solidified when energy is applied. Different types of coalescing agents may have different effects on absorbance, as follows.

In some examples using a radiation absorbing coalescing agent, the agent may cause additional absorption of radiation that is transmitted within the build material, further darkening the solidified area. For example, after delivering coalescing agent but prior to applying energy for solidification, the un-solidified build material may exhibit greater absorbance than un-solidified build material on which coalescing agent was not delivered. This may be because the coalescing agent, upon being delivered into the build material, may be at least partially disposed on the surface of the build material, such that the coalescing agent may act as an absorber and absorb the radiation, thereby increasing absorbance. Carbon black, for example, may be an ingredient of a radiation absorbing coalescing agent that may remain at least partially on the surface of the build material. However, in some examples, the coalescing agent penetrates into the build material or is covered by additional build material such that it is buried and interspersed inside the build material. In such cases, the coalescing agent does not affect the non-solidified build material's surface characteristics, which may be responsible for the low absorbance.

After applying energy for solidification, the absorbance of the solidified build material may increase. For example, radiation may pass through the solidified build material's surface, which may be transparent to the radiation after solidification, and reach the coalescing agent buried and interspersed inside the build material. The coalescing agent may act as an absorber and absorb the radiation, thereby increasing absorbance. In any of these examples, there may remain a significant difference in absorbance in un-solidified versus solidified build material.

In examples in which coalescing agent is not used, un-solidified build material may, for example, have an absorbance between about 0.1 and about 0.2 optical density (OD) units, and solidified build material may have an absorbance of about 0.4 OD units.

In examples in which coalescing agent is used that includes carbon black, the change in absorbance between the non-solidified and solidified build material may, for example, be greater than above. For example, un-solidified build material on which coalescing agent including carbon black has been applied may have an absorbance between about 0.5 and about 1.0 OD units, and solidified build material incorporating carbon black from coalescing agent may have an absorbance between about 1.3 and about 1.8 OD units. This may allow measured absorbance to serve as an accurate indicator of object properties.

However, in other examples, the absorbance may achieve other values than those listed above.

In some examples using a coalescing agent that does not absorb the radiation used for detection, such as visible light, absorbance may not be affected, because the radiation may pass through the coalescing agent. Thus, un-solidified build material having coalescing agent may exhibit absorbance similar to that exhibited by un-solidified build material on which coalescing agent was not delivered. Additionally, in some examples, solidified build material having coalescing agent may exhibit absorbance similar to that exhibited by solidified build material on which coalescing agent was not delivered.

In some examples, un-solidified build material having coalescing agent may exhibit gloss similar to that exhibited by un-solidified build material on which coalescing agent was not delivered. Additionally, in some examples, solidified build material having coalescing agent may exhibit gloss similar to that exhibited by solidified build material on which coalescing agent was not delivered. This may be true regardless of whether coalescing agent settles on the surface of the build material, or penetrates into the build material.

In some examples, some build materials, such as liquids, may instead show a negative, rather than positive, correlation between degree of solidification and absorbance, and between degree of solidification and gloss. This may, for example, be because solidification causes increased roughness on the surface of the liquid build material.

The additive manufacturing system 200 may include a system controller 210. Any of the operations and methods disclosed herein may be implemented and controlled in the additive manufacturing system 200 and/or controller 210.

The controller 210 may include a processor 212 for executing instructions that may implement the methods described herein. The processor 212 may, for example, be a microprocessor, a microcontroller, a programmable gate array, an application specific integrated circuit (ASIC), a computer processor, or the like. The processor 212 may, for example, include multiple cores on a chip, multiple cores across multiple chips, multiple cores across multiple devices, or combinations thereof. In some examples, the processor 212 may include at least one integrated circuit (IC), other control logic, other electronic circuits, or combinations thereof.

The controller 210 may support direct user interaction. For example, the additive manufacturing system 200 may include user input devices 220 coupled to the processor 212, such as one or more of a keyboard, touchpad, buttons, keypad, dials, mouse, track-ball, card reader, or other input devices. Additionally, the additive manufacturing system 200 may include output devices 222 coupled to the processor 212, such as one or more of a liquid crystal display (LCD), printer, video monitor, touch screen display, a light-emitting diode (LED), or other output devices. The output devices 222 may be responsive to instructions to display textual information or graphical data.

The processor 212 may be in communication with a computer-readable storage medium 216 via a communication bus 214. The computer-readable storage medium 216 may include a single medium or multiple media. For example, the computer readable storage medium 216 may include one or both of a memory of the ASIC, and a separate memory in the controller 210. The computer readable storage medium 216 may be any electronic, magnetic, optical, or other physical storage device. For example, the computer-readable storage medium 216 may be, for example, random access memory (RAM), static memory, read only memory, an electrically erasable programmable read-only memory (EEPROM), a hard drive, an optical drive, a storage drive, a CD, a DVD, and the like. The computer-readable storage medium 216 may be non-transitory. The computer-readable storage medium 216 may store, encode, or carry computer executable instructions 218 that, when executed by the processor 212, may cause the processor 212 to perform any one or more of the methods or operations disclosed herein according to various examples.

The system 200 may include a coalescing agent distributor 202 to selectively deliver coalescing agent to successive layers of build material provided on a support member 204. According to one non-limiting example, a suitable coalescing agent may be an ink-type formulation comprising carbon black, such as, for example, the ink formulation commercially known as CM997A available from Hewlett-Packard Company. In one example such an ink may additionally comprise an infra-red light absorber. In one example such an ink may additionally comprise a near infra-red light absorber. In one example such an ink may additionally comprise a visible light absorber. In one example such an ink may additionally comprise a UV light absorber. Examples of inks comprising visible light absorbers are dye based colored ink and pigment based colored ink, such as inks commercially known as CM993A and CE042A available from Hewlett-Packard Company.

The controller 210 controls the selective delivery of coalescing agent to a layer of provided build material in accordance with instructions comprising agent delivery control data 208, which may, for example, be derived from object design data 206.

The agent distributor 202 may be a printhead, such as a thermal inkjet printhead or a piezo inkjet printhead. The printhead may have arrays of nozzles. In one example, printheads such as those commonly used in commercially available inkjet printers may be used. In other examples, the agents may be delivered through spray nozzles rather than through printheads. Other delivery mechanisms may be used as well. The agent distributor 202 may be used to selectively deliver, e.g. deposit, coalescing agent when in the form of suitable fluids such as a liquid. In some examples, the agent distributor 202 may be selected to deliver suitably sized drops of agent at any suitable resolution. In some examples the coalescing agent may comprise a liquid carrier, such as water or any other suitable solvent or dispersant, to enable it to be delivered via a printhead. In some examples the printhead may be a drop-on-demand printhead. In other examples the printhead may be a continuous drop printhead.

In the example illustrated in FIG. 2a, the agent distributor 202 has a length that enables it to span the whole width of the support member 204 in a so-called page-wide array configuration. In one example this may be achieved through a suitable arrangement of multiple printheads. In other examples a single printhead having an array of nozzles having a length to enable them to span the width of the support member 204 may be used. In other examples, the agent distributor 202 may have a shorter length that does not enable them to span the whole width of the support member 204.

The agent distributor 202 may be mounted on a moveable carriage to enable it to move bi-directionally across the length of the support 204 along the illustrated y-axis. This enables selective delivery of coalescing agent across the whole width and length of the support 204 in a single pass. In other examples the agent distributor 202 may be fixed, and the support member 204 may move relative to the agent distributor 202.

It should be noted that the term 'width' used herein is used to generally denote the shortest dimension in the plane parallel to the x and y axes illustrated in FIG. 2a, whilst the term 'length' used herein is used to generally denote the longest dimension in this plane. However, it will be understood that in other examples the term 'width' may be interchangeable with the term 'length'. For example, in other examples the agent distributor 202 may have a length that enables it to span the whole length of the support member 204 whilst the moveable carriage may move bi-directionally across the width of the support 204.

In another example the agent distributor 202 does not have a length that enables it to span the whole width of the support member but are additionally movable bi-directionally across the width of the support 204 in the illustrated x-axis. This configuration enables selective delivery of coalescing agent and coalescence modifier agent across the whole width and length of the support 204 using multiple passes. Other configurations, however, such as a page-wide array configuration, may enable three-dimensional objects to be created faster.

The coalescing agent distributor 202 may include a supply of coalescing agent or may be connectable to a separate supply of coalescing agent.

The system 200 may further comprise a build material distributor 224 to provide, e.g. deliver and/or deposit, successive layers of build material on the support member 204. Suitable build material distributors 224 may include, for example, a wiper blade and a roller. Build material may be supplied to the build material distributor 224 from a hopper or build material store. In the example shown the build material distributor 224 moves across the length (y-axis) of the support member 204 to deposit a layer of build material. As previously described, a layer of build material will be deposited on the support member 204, whereas subsequent layers of build material will be deposited on a previously deposited layer of build material. The build material distributor 224 may be a fixed part of the system 200, or may not be a fixed part of the system 200, instead being, for example, a part of a removable module.

In some examples, the thickness of each layer may have a value selected from the range of between about 50 to about 300 microns, or about 90 to about 110 microns, or about 250 microns, although in other examples thinner or thicker layers of build material may be provided. The thickness may be controlled by the controller 210, for example based on the agent delivery control data 208.

In some examples, there may be additional agent distributors, and build material distributors relative to the distributors shown in FIG. 2a. In some examples, the distributors of system 200 may be located on the same carriage, either adjacent to each other or separated by a short distance. In other examples, two or more carriages each may contain one or more distributors. For example, each distributor may be located in its own separate carriage. Any additional distributors may have similar features as those discussed earlier with reference to the coalescing agent distributor 202. However, in some examples, different agent distributors may deliver different coalescing agents, for example.

In the example shown the support 204 is moveable in the z-axis such that as new layers of build material are deposited a predetermined gap is maintained between the surface of the most recently deposited layer of build material and lower surface of the agent distributor 202. In other examples, however, the support 204 may not be movable in the z-axis and the agent distributor 202 may be movable in the z-axis.

The system 200 may additionally include an energy source 226 to apply energy to build material to cause the solidification of portions of the build material according to where coalescing agent has been delivered or has penetrated. In some examples, the energy source 226 is an infra-red (IR) radiation source, near infra-red radiation source, halogen radiation source, or a light emitting diode. In some examples, the energy source 226 may be a single energy source that is able to uniformly apply energy to build material deposited on the support 204. In some examples, the energy source 226 may comprise an array of energy sources.

In some examples, the energy source 226 is configured to apply energy in a substantially uniform manner to the whole surface of a layer of build material. In these examples the energy source 226 may be said to be an unfocused energy source. In these examples, a whole layer may have energy applied thereto simultaneously, which may help increase the speed at which a three-dimensional object may be generated.

In other examples, the energy source 226 is configured to apply energy in a substantially uniform manner to a portion of the whole surface of a layer of build material. For example, the energy source 226 may be configured to apply energy to a strip of the whole surface of a layer of build material. In these examples the energy source may be moved or scanned across the layer of build material such that a substantially equal amount of energy is ultimately applied across the whole surface of a layer of build material.

In some examples, the energy source 226 may be mounted on the moveable carriage.

In other examples, the energy source 226 may apply a variable amount of energy as it is moved across the layer of build material, for example in accordance with agent delivery control data 208. For example, the controller 210 may control the energy source only to apply energy to portions of build material on which coalescing agent has been applied.

In further examples, the energy source 226 may be a focused energy source, such as a laser beam. In this example the laser beam may be controlled to scan across the whole or a portion of a layer of build material. In these examples the laser beam may be controlled to scan across a layer of build material in accordance with agent delivery control data. For example, the laser beam may be controlled to apply energy to those portions of a layer of on which coalescing agent is delivered.

The combination of the energy supplied, the build material, and the coalescing agent may be selected such that, excluding the effects of any coalescence bleed: i) portions of the build material on which no coalescing agent have been delivered do not coalesce when energy is temporarily applied thereto; ii) portions of the build material on which only coalescing agent has been delivered or has penetrated coalesce when energy is temporarily applied thereto do coalesce.

Figure 2B:
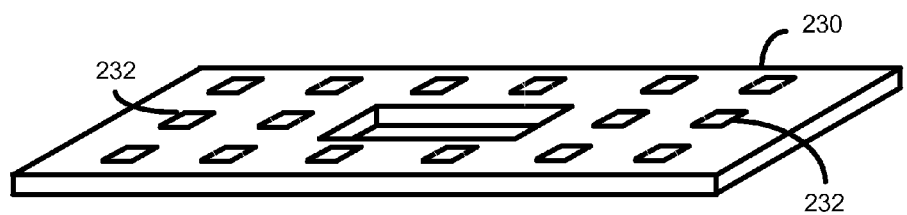
FIG. 2b is a simplified isometric illustration of a heater for an additive manufacturing system according to some examples.

The system 200 may additionally include a heater 230 to emit heat to maintain build material deposited on the support 204 within a predetermined temperature range. The heater 230 may have any suitable configuration. One example is shown in FIG. 2b, which is a simplified isometric illustration of a heater 230 for an additive manufacturing system according to some examples. The heater 230 may have an array of heating elements 232, as shown in FIG. 2B. The heating units 232 may be each be any suitable heating unit, for example a heat lamp such as an infra-red lamp. The heating units 232 may have any suitable shapes or configurations such as rectangular as shown in FIG. 2b. In other examples they may be circular, rod shaped, or bulb shaped, for example. The configuration may be optimized to provide a homogeneous heat distribution toward the area spanned by the build material. Each heating unit 232, or groups of heating units 232, may have an adjustable current or voltage supply to variably control the local energy density applied to the build material surface.

Each heating unit 232 may correspond to its own respective area of the build material, such that each heating unit 232 may emit heat substantially toward its own area rather than areas covered by other heating units 232. For example, each of the sixteen heating units 232 in FIG. 2b may heat one of sixteen different areas of the build material, where the sixteen areas collectively cover the entire area of the build material. However, in some examples, each heating unit 232 may also emit, to a lesser extent, some heat which influences an adjacent area.

In some examples, additionally or alternatively to the heater 230, a heater may be provided below the platen of the support member 204 to conductively heat the support member 204 and thereby the build material. The conductive heater may be to uniformly heat the build material across its area on the support member 204.

The system 200 may additionally include a radiation sensor 229, for example a point contactless temperature sensor such as one or more thermopiles, or such as a thermographic camera. In other examples, the sensor 229 may include an array of fixed-location pyrometers which each capture radiation from a single area of the build material. In other examples, the sensor 229 may be a single pyrometer which may be operable to sweep or scan over the entire area of the build material. Other types of sensors may also be used.

The temperature sensor 229 may be to capture a radiation distribution, for example in the IR range, emitted by each point of the build material across the area spanned by the build material on the support member 204. The temperature sensor 229 may output the radiation distribution to the controller 210. The radiation distribution data may then be used for calculating temperature of the material, as will be described relative to FIG. 3.

The sensor 229 may be oriented generally centrally and facing generally directly toward the build material, such that the optical axis of the camera targets the center line of the support member 204, to allow a generally symmetric capture of radiation from the build material. This may minimize perspective distortions of the build material surface, thus minimizing the need for corrections, and reducing errors in measured temperature values versus real temperature values. Additionally, the sensor 229 may be able to (1) capture the image over a wide region covering an entire layer of build material, for example by using suitable magnification, (2) capture a series of images of the entire layer which are later averaged, or (3) capture a series of images each covering a portion of the layer that together cover the entire layer. In some examples, the sensor 229 may be in a fixed location relative to the support member 204, but in other examples may be moveable if other components, when moving, disrupt the line of sight between the camera 229 and the support member 204.

The system 200 may additionally include a radiation sensor 228 to measure an optical property of the build material that is correlated with emissivity and/or degree of solidification of the build material. Examples of optical properties include absorbance or gloss of the build material, but other optical properties may be used. The radiation sensor 228 may be to measure, e.g. capture, radiation reflected from the build material on the support member 204. At each area of the build material, the measurement of radiation may involve measuring a radiation distribution that is a spectral distribution comprising radiant intensity values as a function of radiation wavelengths. The radiation sensor 228 may also be to measure the angle of reflection of radiation from the build material. The radiation sensor 228 may output data representing the measurements to the controller 210, which may determine steps to be performed by the controller 210 if the build material has not solidified as intended. FIGS. 2c-2f show various examples using a radiation sensor 228.

The radiation sensor 228 may, for example, be part of a reflectometer, densitometer, colorimeter, digital camera, gloss meter, or haze meter. The sensor itself may, for example, comprise a phototransistor, photodiode, light-to-voltage converter integrated circuit (e.g. a photodiode or phototransistor with support circuitry), contact image sensor, or charge coupled device. The radiation sensor 228 may also comprise lenses and/or filters to help collect and sort light when using any of the above sensors.

Figure 2C:
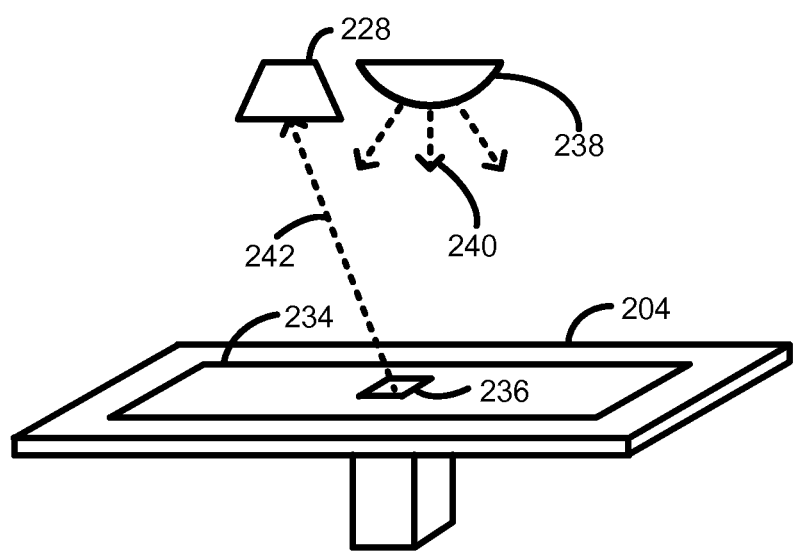
FIG. 2c is a simplified isometric illustration of a radiation sensor and an unfocused radiation source in an additive manufacturing system according to some examples.

FIG. 2c is a simplified isometric illustration of a radiation sensor 228 and an unfocused radiation source 238 in the additive manufacturing system 200 according to some examples. In this example, the radiation sensor 228 may be used to measure absorbance. Thus, the radiation sensor 228 may, for example, be part of a reflectometer, densitometer, colorimeter, or digital camera. However, other types of sensors may be used. In these examples, the radiation sensor 228 may include or may be used with an unfocused radiation source 238. For example, if the radiation sensor 228 is a densitometer, the radiation sensor 228 may include the unfocused radiation source 238.

In some examples, the energy source 226 or the heater 230 may be used as the unfocused radiation source 238. In these examples, the radiation sensor 228 may, for example, include a filter to block a portion of the radiation, e.g. infra-red radiation, from the energy source 226 or the heater 230, such that the radiation sensor 228 detects a visible light tail of radiation reflected by the build material, but not infra-red radiation from the build material. Thus, the infra-red radiation used for heating or solidification of build material may not interfere with the visible light radiation used for detection of solidification.

In some examples, the unfocused radiation source 238 may be separate from the energy source 226 and the heater 230. In these cases, the radiation sensor 228 may similarly include a filter to block a portion of the radiation, e.g. infra-red radiation, from the energy source 226, heater 230, and the build material. Additionally, the unfocused radiation source 238 may, for example, apply radiation in a radiant spectrum that is substantially different than the radiant spectra applied by the energy source 226 and heater 230. For example, the unfocused radiation source 238 may apply radiation in the visible light range, whereas the energy source 226 and heater 230 may primarily apply radiation in the infra-red range. Thus, interference may be reduced or prevented between the infra-red radiation used for heating or solidification of build material and the visible light radiation used for detection of solidification.

To measure absorbance, the radiation source 238 may apply unfocused radiation 240 to the build material 234, and a radiation distribution 242 reflected from a portion 236 of the build material 234 may be measured by radiation sensor 228. The wavelengths of the unfocused radiation 240 may be selected such that the radiation 240 is not absorbed when the portion 236 is not solidified, and such that the radiation 240 is absorbed when the portion 236 is solidified and/or contains coalescing agent therein. The coalescing agent may be selected, for example carbon black, such that it absorbs the wavelengths of the unfocused radiation.

Figure 2D:
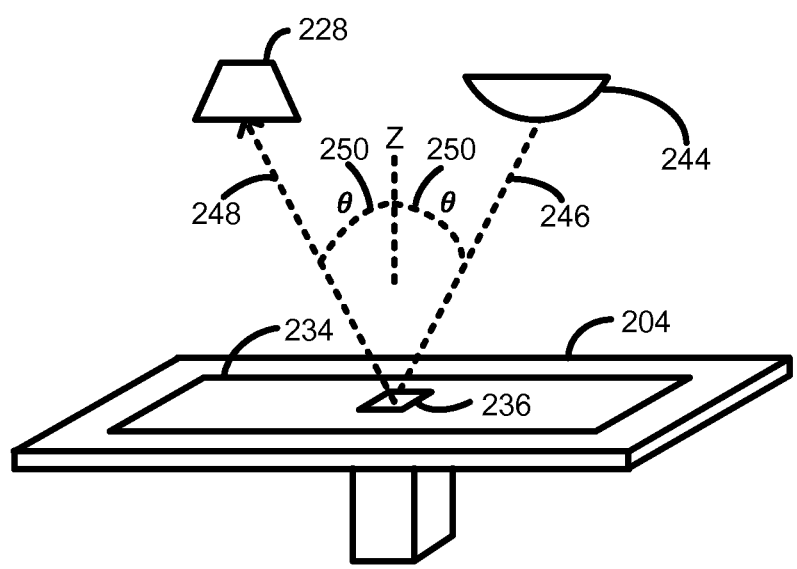
FIG. 2d is a simplified isometric illustration of a radiation sensor and a focused radiation source in an additive manufacturing system according to some examples.

FIG. 2d is a simplified isometric illustration of a radiation sensor 228 and a focused radiation source 244 in an additive manufacturing system 200 according to some examples. In this example, the radiation sensor 228 may be used to measure gloss. Thus, the radiation sensor 228 may, for example, be part of a gloss meter, densitometer, reflectometer, or digital camera. However, other types of sensors may be used. In these examples, the radiation sensor 228 may include or may be used with a focused radiation source 244. In some examples, if the energy source 226 is a focused energy source, then it may be used as the focused radiation source 244. In some examples, the focused radiation source 244 may be separate from the energy source 226. In some examples, the focused radiation source 244 may, for example, apply radiation in a radiant spectrum that is substantially different than the radiant spectra applied by the energy source 226 and heater 230 to reduce or prevent interference between radiation used for heating or solidification of build material and radiation used for detection of solidification.

To measure gloss, the radiation source 244 may apply focused radiation 246a to a portion 236 of the build material 234 at an angle (θ) 250 from the z-axis, and the radiation sensor 228 may measure any of the radiation 248 that exhibits specular reflection at the opposite and equal angle (θ) 250 from the surface of the portion 236. Thus, the overall angular change in the reflected radiation may be twice the angle 250 (2θ).

In some examples, in measuring gloss, the radiation source 244 may instead be unfocused, and the radiation sensor 228 may be fitted with apertures to filter out off-angle radiation. This may be acceptable because the reflection of unfocused radiation from the build material at the specular angle may substantially exceed radiation scattering from other angles received by the radiation sensor 228.

The radiation sensor 228 and the radiation source 244 may be arranged such that the angle (θ) 250 may take on any suitable value, for example any value greater than 0 degrees and less than 90 degrees, or between about 5 and about 85 degrees, or between about 15 and 75 degrees, or between about 20 and about 60 degrees, for example. Thus, the angle (θ) 250 may be non-zero.

In some examples, the radiation sensor 244 may be part of a haze meter. These examples may be similar to above, except that in these examples, the radiation sensor 244 may instead be placed at a non-specular angle, such that it detects non-specular refection from the portion 236 to detect radiation. In this case, the degree of non-specular reflection may negatively correlate with gloss of the portion 236, because it may be inferred that increased non-specular reflection correlates with decreased specular reflection.

Figure 2E:
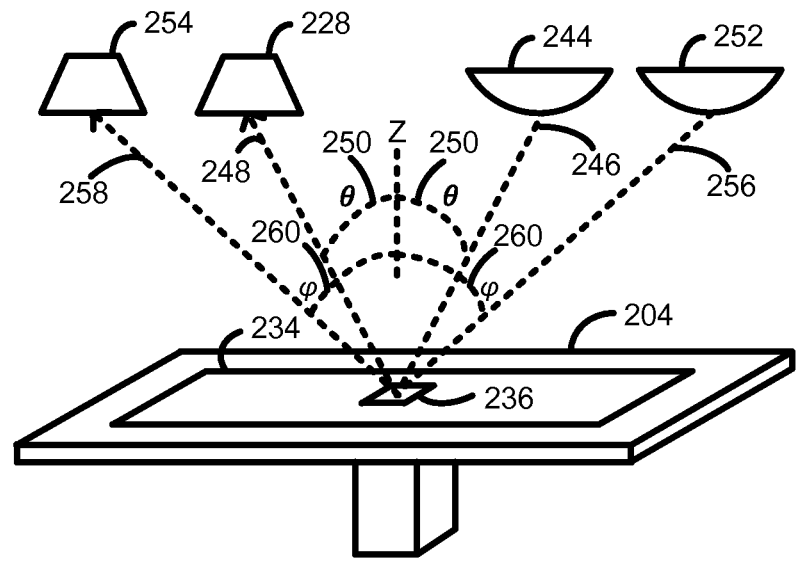
FIG. 2e is a simplified isometric illustration of two radiation sensors and two focused radiation sources in an additive manufacturing system according to some examples.

FIG. 2e is a simplified isometric illustration of two radiation sensors 228 and 254 and two focused radiation sources 244 and 252 in an additive manufacturing system 200 according to some examples. FIG. 2e may include similar features as those in FIG. 2d, except for the additional radiation source 252 and additional radiation sensor 254. The radiation sensor 254 may, for example, be part of a gloss meter, densitometer, reflectometer, or digital camera. The radiation source 252 may apply focused radiation 256 at an angle (φ) 260 from the z-axis to be specularly reflected by the portion 236 as radiation 258 at the opposite and equal angle (φ) 260. Thus, relative to the radiation sensor 228 and radiation source 244 described earlier, the specular reflection using radiation sensor 254 and radiation source 252 may be similar to and may be used similarly in determining solidification of the portion 236. Thus, two concurrent gloss measurements may be made involving specular reflection at different angles 250 and 260. Thus, reliability of the measurement may be increased, and errors due to unintended interference by other light sources may be reduced. In other examples, three or more radiation sensors and three or more radiation sources may be used to concurrently measure specular reflection at three or more different angles.

Figure 2F:
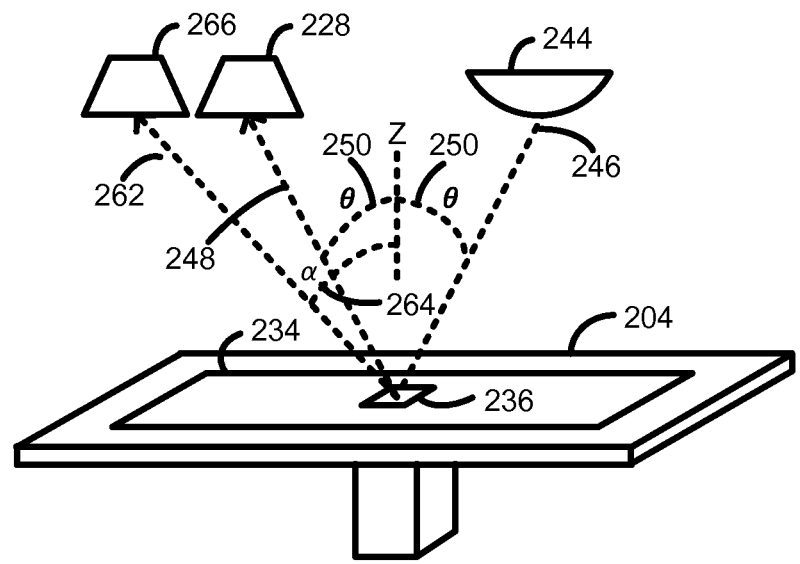
FIG. 2f is a simplified isometric illustration of two radiation sensors and a focused radiation source in an additive manufacturing system according to some examples.

FIG. 2f is a simplified isometric illustration of two radiation sensors 228 and 254 and a focused radiation source 244 in an additive manufacturing system 200 according to some examples. FIG. 2f may include similar features to those in FIG. 2d, except for the additional radiation sensor 266. The radiation sensor 266 may, for example, be part of a gloss meter, haze meter, densitometer, reflectometer, or digital camera. The radiation sensor 266 may be placed at a non-specular angle (α) 264, i.e. an angle other than angle (θ). In some examples, some of the radiation 246 may be non-specularly reflected as radiation 262. The degree of non-specular reflection may be negatively correlated with solidification of the portion 236. Thus, the non-specular reflection may be used provide fine correction to the gloss measurement represented by the specular reflection, in the following ways. In some examples, a ratio between the magnitude of the detected radiation 248 and detected radiation 262, or between the detected radiation 248 and detected radiation 262, may provide a precise measure of gloss. In other examples, the radiation sensor 266 may measure stray radiation from other sources, for example the energy source 226. Thus, the measurement by radiation sensor 228 may be corrected to correct for unintended stray radiation, such that the radiation sensor 228 may accurately provide a measurement of specularly reflected radiation 248.

In any of the examples above in which the wavelength(s) of the energy source 226 used to impart energy to the build material and the wavelength(s) of the radiation source used to measure the optical property, such as absorbance or gloss, of the build material substantially overlap, a differential signal technique can be used to acquire a signal free of background radiation from the energy source 226. The radiation source used for measurement may apply radiation that is pulsed, i.e. turned on and off at a desired frequency, for example but not limited to a frequency selected from the range of 1 to 1000 Hz. The radiation sensor may measure a radiation distribution while the radiation source is on and may also measure a radiation distribution while the radiation source is off. These distributions may be compared, and the difference of these values may represent the desired quantity to be measured with the background radiation removed.

In any of the above examples, although measurement is shown relative to portion 236, other portions of the build material 234 may also be measured, for example the portions bordering to the portion 236.

Although in FIGS. 2a, 2c, 2d, 2e, and 2f, the energy source 226, heater 230, radiation sensors 228 and 254, and radiation sources 238, 244, and 252 are shown in particular locations above the support member 204, they may each be placed in any suitable location above or around the support member 214. In some examples, one or more of these components may be in a fixed location relative to the support member 204, but in other examples may be moveable if other components, when moving, disrupt the line of sight to the support member 204.

The controller 210 may control selective delivery of agents, such as coalescing agents, in accordance with instructions comprising agent delivery control data 208. The controller 210 may also control the energy source 226 to apply a variable amount of energy as it is moved across the layer of build material, for example in accordance with agent delivery control data 208. The agent delivery control data 208 may define for each slice of the three-dimensional object to be generated the portions or the locations on the build material, if any, at which coalescing agent is to be delivered. In one example the locations or portions of the build material at which coalescing agent is to be delivered are defined by way of respective patterns.

The agent delivery control data 208 may be derived, for example, by a suitable three-dimensional object processing system. In some examples the three-dimensional object processing system may be comprised within the additive manufacturing system 200. For example, the instructions 218 may additionally include instructions that, when executed by the processor 212, cause the processor 212 to operate as a three-dimensional object processing system as described herein. In other examples the three-dimensional object processing system may be external to the additive manufacturing system 200. For example, the three-dimensional object processing system may be a software application, or part of a software application, executable on a computing device separate from the system 200.

In some examples, the agent delivery control data 208 may be generated based on object design data 206 including (1) object model data representing a three-dimensional model of an object to be generated, and/or (2) object property data representing properties of the object such as density, surface roughness, strength, and the like. The object model data may define a degree of intended solidification, e.g. solidified or un-solidified, of each portion of the object, and may be processed by the three-dimensional object processing system to generate slices of parallel planes of the model. Each slice may define a portion of a respective layer of build material that is to be solidified by the additive manufacturing system. The object model day may be in any suitable format, for example a raster map or vector map.

The object design data 206 may be received, for example, from a user via an input device 220, as input from a user, from a software driver, from a software application such as a computer aided design (CAD) application, or may be obtained from a memory storing default or user-defined object design data and object property data.

In some examples the object processing system may obtain data relating to characteristics of the additive manufacturing system 200. Such characteristics may include, for example, build material layer thickness, properties of the coalescing agent, properties of the coalescence modifier agent, properties of the build material, and properties of the energy source 226, properties of the heater 230, and properties of the temperature sensor 228.

FIG. 3a is a flow diagram illustrating a method 300 of generating a three-dimensional object according to some examples. The method may be computer implemented. In some examples, the orderings shown may be varied, such that some steps may occur simultaneously, some steps may be added, and some steps may be omitted. In describing FIG. 3a, reference will be made to FIGS. 2 and 4a-h. FIGS. 4a-h show a series of cross-sectional side views of layers of build material according to some examples.

At 302, the emissivity of the build material for each of a number of degrees of solidification, such as solidified and un-solidified, may be determined. This may be done, for example, if the type of build material is unknown. The emissivities may be determined according to any of the following methods.

In some examples, the controller 210 may control the build material distributor 224 to provide a layer of build material on the support member 204 by causing the build material distributor 224 to move along the y-axis as discussed earlier. The controller 210 may then cause an agent distributor to selectively deliver an agent having known emissivity to a portion of the layer of build material. The agent may be any of the coalescing agents described earlier such as carbon black, or may be any other suitable agent with a known emissivity. Then, the layer may be heated using the heater 230 or using the conductive heater beneath the platen of the support member 204. The heating may be uniform across the layer, such that the agent, and the portion not having agent, may have the same temperature. The agent may radiate the heat it absorbed, and similarly, the portion of the build material not having the agent may then radiate the heat it absorbed. The radiation emitted by the agent and by the portion without agent may then be separately measured by the radiation sensor 228. The measurement may be made after the amount of emitted radiation stabilizes after heating. The IR energy emitted by a black body at the temperature T is equal to the IR energy actually emitted by a portion divided by the portion's emissivity:

$$IR\text{ blackbody energy}[T] = \frac{IR\text{ energy}[\text{agent}]}{\text{emissivity}[\text{agent}]} = \frac{IR\text{ energy}[\text{build material}]}{\text{emissivity}[\text{build material}]}$$

Thus, the emissivity of the portion of build material without agent may be determined by the controller 210 by inputting the known value of the emissivity of the agent, and the measured values of the IR energy emitted by the agent and the IR energy emitted by the portion of the build material not having the agent. In some examples, to determine emissivities of the build material after various degrees of solidification, various portions of the build material may be solidified to various degrees using any suitable solidification process such as those described earlier, after which a similar process as above may be performed as was done with the un-solidified portion without agent.

In other examples, the temperature in a build area is known for the particular additive manufacturing system being used. In these examples, the layer may be delivered on the support member 104 as above. Then, build material may radiate heat, which may be measured by the radiation sensor 228. Then, the emissivity of the build material may be determined by the controller 210 using the earlier formula, given the known energy emitted by a blackbody at the known temperature T, and the measured IR energy emitted by the build material:

$$\text{emissivity[build material]} = \frac{IR \text{ energy[build material]}}{IR \text{ blackbody energy}[T]}$$

This example may instead involve measuring the IR energy emitted by the build material at two or more different known temperatures of the additive manufacturing system. Thus, for example, two or more different emissivity values may be determined and averaged. In some examples, to determine emissivities of the build material after various degrees of solidification, various portions of the build material may be solidified to various degrees using any suitable solidification process such as those described earlier, after which a similar process as above may be performed as was done with the un-solidified build material.

In other examples, the layer may be delivered on the support member 104 as above, and emissivity may be measured using techniques similar to those described earlier relative to measuring absorbance. However, in these examples, the radiation source may apply IR radiation, and the amount of reflected IR radiation detected by an IR sensor may be used by the controller 210 to determine the emissivity of the build material.

In the above examples, the layer used for determining emissivity may be cleared off the support prior to starting the build at 306. However, in other examples, the build may begin on top of the layer used for determining emissivity.

In yet other examples, 302 may not be performed, for example if the emissivities are already known because the type of build material is known.

At 304, (1) each of the determined or known emissivities may be correlated by the controller 210 to a degree of solidification, and (2) each of the determined or known emissivities for each degree of solidification may be correlated by the controller 210 to an optical property, such as absorbance or gloss, of the build material having that degree of solidification. The values of the optical property, such as absorbance or gloss, may be known for the type of material and stored in the controller 210, or in other examples measurements may be made according to any of the techniques described earlier relative to FIGS. 2a-2f, for example using the radiation source 238, 244, and/or 252, and the radiation sensor 228 and/or 254. The radiation sensor 228 and/or 254 may output data representing the measured absorbance and/or gloss to the controller 210.

The correlations between emissivity and solidification, and between emissivity and various optical properties such as absorbance and gloss, may thus be stored in the controller 210. The correlations may be stored in look-up tables, as mathematical formulae fitted to the known data points of the correlations, or as any other suitable data objects.

At 306, the controller 210 may obtain object design data 206 and, based thereon, may generate agent delivery control data 208.

Figure 4A:
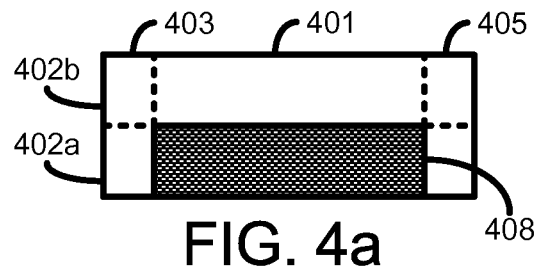
FIGS. 4a-d show a series of cross-sectional side views of layers of build material according to some examples.

At 308, a layer 402b of build material may be provided, as shown in FIG. 4a. For example, the controller 210 may control the build material distributor 224 to provide the layer 402b on a previously completed layer 402a on the support member 204 by causing the build material distributor 224 to move along the y-axis as discussed earlier. The completed layer 402a may include a solidified portion 408. Although a completed layer 402a is shown in FIGS. 4a-d for illustrative purposes, it is understood that the steps 308 to 322 may initially be applied to generate the first layer 402a.

At 310, the build material may be heated by the heater 230 to heat and/or maintain the build material within a predetermined temperature range. The predetermined temperature range may, for example, be below the temperature at which the build material would experience bonding in the presence of coalescing agent 404, for example below the melting point of the build material. For example, the predetermined temperature range may be between about 155 and about 160 degrees Celsius, or the range may be centered at about 160 degrees Celsius. If the build material is crystalline or semi-crystalline, the predetermined temperature range may be between the crystallization temperature and the melting point of the build material. Other temperature ranges may be used depending on the type of build material. Pre-heating may help reduce the amount of energy that has to be applied by the energy source 226 to cause coalescence and subsequent solidification of build material on which coalescing agent has been delivered or has penetrated.

In some examples, different portions of the layer 402b may be heated to different amounts by the heating elements 232, based on the temperature distribution across the different portions of the layer 402b that was determined in a previous iteration of 308 to 322. For example, more heat may be applied to portions with lower determined temperatures relative to portions with greater determined temperatures. Thus, a generally uniform temperature distribution may be achieved after heating, even if the temperature distribution was non-uniform before heating.

In some examples, if some portions of the layer 402b have temperatures that are too high, these portions may be cooled by a suitable cooling mechanism or agent. Thus, temperature regulation of the build material may involve the controller 210 causing a temperature regulating unit, such as a heater or cooling mechanism, to change the temperature of the build material, e.g. one or both of heating and cooling, based on the temperature determined in a previous iteration of 308 to 322.

Figure 4B:
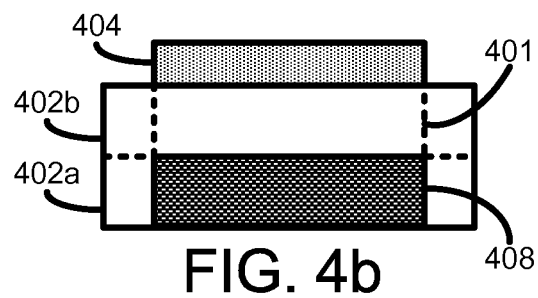

At 312, as shown in FIG. 4b, a coalescing agent 404 may be selectively delivered to the surface of the one or more portions 401 of the layer 402b. As discussed earlier, the agent 404 may be delivered by agent distributor 202, for example in the form of fluids such as liquid droplets. Agent 404 may not be delivered to portions 403 and 405.

The selective delivery of the agent 404 may be performed in patterns on the portions 401 of the layer 402b that the agent delivery control data 208 may define to become solid to form part of the three-dimensional object being generated. "Selective delivery" means that agent may be delivered to selected portions of the surface layer of the build material in various patterns. The patterns may be defined by the agent delivery control data 208.

Figure 4C:
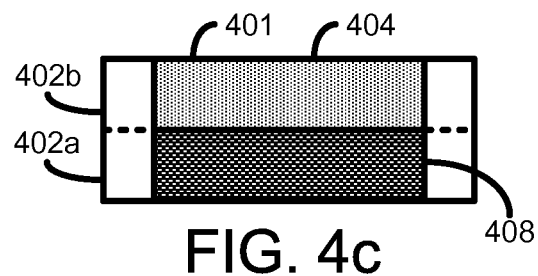

FIG. 4c shows coalescing agent 404 having penetrated substantially completely into the portions 401 of the layer 402b of build material, but in other examples, the degree of penetration may be less than 100%. The degree of penetration may depend, for example, on the quantity of agent delivered, on the nature of the build material, on the nature of the agent, etc.

However, in some examples, coalescing agent 404 may not be delivered, for example if the solidification of build material is achieved using a focused energy source.

At 314, a predetermined level of energy may be temporarily applied to the layer 402b of build material. In various examples, the energy applied may be infra-red or near infra-red energy, microwave energy, ultra-violet (UV) light, halogen light, ultra-sonic energy, or the like. The length of time the energy is applied for, or energy exposure time, may be dependent, for example, on one or more of: characteristics of the energy source; characteristics of the build material; and characteristics of the coalescing agent. The type of energy source used may depend on one or more of: characteristics of the build material; and characteristics of the coalescing agent. In one example, the energy may be applied for a predetermined length of time.

Figure 4D:
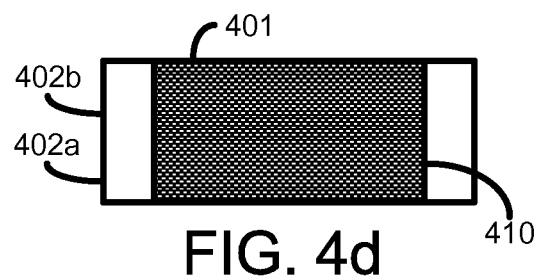

The temporary application of energy may cause the portions 401 of the build material to heat up above the melting point of the build material and to coalesce. In some examples, the energy source may be focused, and coalescing agent 404 may not have been provided at 312. In other examples, the energy source may be unfocused, and the temporary application of energy may cause the portions 401 of the build material on which coalescing agent 404 has been delivered or has penetrated to heat up above the melting point of the build material and to coalesce. For example, the temperature of some or all of the layer 402b may achieve about 220 degrees Celsius. Upon cooling, the portion 401 may coalesce may become solid and form part of the three-dimensional object being generated, as shown in FIG. 4d.

As discussed earlier, one such solidified portion 408 may have been generated in a previous iteration. The heat absorbed during the application of energy may propagate to the previously solidified portion 408 to cause part of portion 408 to heat up above its melting point. This effect helps creates a portion 410 that has strong interlayer bonding between adjacent layers of solidified build material, as shown in FIG. 4d.

At 316, an optical property, such as absorbance and/or gloss, of the surface of the portions 401, 403, and 405 of the layer 402b of build material may be measured. In some examples, as discussed earlier, the measurement may be made after or during applying the energy at 314. The measurement may be made according to any of the techniques described earlier relative to FIGS. 2a-2f, for example using the radiation source 238, 244, and/or 252, and the radiation sensor 228 and/or 254. One measurement may be made for each portion 401, 403, and 405, or multiple measurements in different regions of each portion 401, 403, and 405 may be made, for example.

The measured optical property may be used at 318 when determining emissivity of portions of build material. However, in other examples, such as if emissivity is determined based on object design data 206 rather than optical properties, then 316 may not be performed.

At 318, emissivities of each of the portions 401, 403, and 405 may be determined.

In some examples, the emissivities may be determined using the optical property measurements, such as absorbance and/or gloss measurements, made at 316 and the correlations between emissivity and the optical properties determined or stored at 304. For example, for each portion 401, 403, and 405, the emissivity may be the emissivity value stored in the correlation table or other data object corresponding to the optical property values measured at 316.

In some examples, the emissivities may be determined using the object design data 206 and the correlations between emissivity and solidification determined or stored at 304. For example, for each portion 401, 403, and 405, the emissivity may be the emissivity value stored in the correlation table or other data object corresponding to the intended degree of solidification defined on the object design data 206 for the respective portion 401, 403, or 405. Thus, for example, the object design data may define that the portion 403 was intended to experience a predetermined degree of solidification. The correlation data or other data object may map that degree of solidification to an emissivity value.

Any of the above methods of determining emissivity may be used in combination, and the emissivity determinations using different methods may be averaged or otherwise mathematically combined to provide a determination that is more accurate and more robust to errors.

At 320, the sensor 229 may capture an image representing a radiation distribution, such as IR radiation, emitted by each of one or more areas of the layer 402b, for example including portions 401, 403, and 405. As discussed earlier, in other examples, a series of images may be taken to generate a composite or averaged image representing the radiation distribution.

At 322, temperatures across the layer 402b may be determined by the controller 210 based on the emissivities determined at 318 and based on the radiation distributions measured at 320. As discussed earlier, the temperature of a portion of build material may depend on the measured IR radiation distribution, and based on the emissivity. The methods herein may, in some examples, allow sufficient resolution such that a large number of temperature determinations may be made each corresponding to a small area of the layer 402b. Thus, each of the areas for which a temperature may be determined may be small enough that it does not contain both solidified and non-solidified material. For example, for each portion 401, 403, and 405, one or more temperatures may be determined.

However, in other examples, if a single radiation distribution measurement was made for a region spanning solidified and un-solidified areas, such as portions 401 and 403, then the determination of the temperature of each of the portions 401 and 403 may be determined based on (1) the determined emissivity, (2) the measured radiation distribution, (3) known relative sizes of the areas spanned by the portions 401 and 403, which may be determined based on the object design data 206 or based on the emissivity measurements or other sensor measurements, and (4) in some examples but not necessarily all examples, the relative difference in heating typically caused in a solidified portion compared to a non-solidified portion. the controller 210 may be able to determine the temperatures. The above information may be enough to determine temperatures of each of the solidified portion 401 and non-solidified portion 403, despite the temperature measurement spanning both portions.

Although determining temperatures using the method of 316 to 322 is shown as being performed after applying energy at 314, in other examples, 316 to 322 may be performed continually throughout the method 300, may be performed at any other time during the method 300, such as between 308 and 310, between 310 and 312, and/or between 312 and 314.

After a layer of build material has been processed as described above in 308 to 322, new layers of build material may be provided on top of the previously processed layer of build material. In this way, the previously processed layer of build material acts as a support for a subsequent layer of build material. The process of 308 to 322 may then be repeated to generate a three-dimensional object layer by layer.

All of the features disclosed in this specification (including any accompanying claims, abstract and drawings), and/or all of the steps of any method or process so disclosed, may be combined in any combination, except combinations where at least some of such features and/or steps are mutually exclusive.

In the foregoing description, numerous details are set forth to provide an understanding of the subject disclosed herein. However, examples may be practiced without some or all of these details. Other examples may include modifications and variations from the details discussed above. It is intended that the appended claims cover such modifications and variations.

The invention claimed is:

1. An additive manufacturing system comprising:
a first radiation sensor to measure an optical property of a portion of a layer of build material;
a second radiation sensor to measure a radiation distribution emitted by the portion; and
a controller to:
receive, from the first radiation sensor, data representing the measured optical property;
determine an emissivity of the portion based on the measured optical property of the portion;
receive, from the second radiation sensor, data representing the measured radiation distribution emitted by the portion; and
determine a temperature of the portion based on the determined emissivity and the measured radiation distribution emitted by the portion.

2. The additive manufacturing system of claim 1, wherein the optical property is absorbance.

3. The additive manufacturing system of claim 2, wherein the controller is to control an agent distributor to selectively deliver a coalescing agent to the portion to cause the portion to coalesce when energy is applied by an energy source, wherein the coalescing agent is to absorb unfocused radiation used for measuring the absorbance, the unfocused radiation being received from the energy source or another radiation source.

4. The additive manufacturing system of claim 1, further comprising an unfocused radiation source to apply unfocused radiation to the portion, the build material to reflect the unfocused radiation for detection by the first radiation sensor to measure the absorbance of the portion, the unfocused radiation having a different radiant spectrum than an energy applied by an energy source that is to apply energy to cause the portion of the layer of build material to coalesce and subsequently solidify.

5. The additive manufacturing system of claim 1, wherein the optical property is gloss.

6. The additive manufacturing system of claim 5, further comprising a focused radiation source to apply focused radiation to the build material, the build material to reflect the focused radiation for detection by the first radiation sensor to measure a specular reflection or gloss of the build material, the focused radiation having a different radiant spectrum than an energy applied by an energy source that is to apply energy to cause the portion of the layer of build material to coalesce and subsequently solidify.

7. The additive manufacturing system of claim 1, further comprising a radiation source to apply pulsed radiation to the build material, the build material to reflect the pulsed radiation for detection by the first radiation sensor such that the detected pulsed radiation when the radiation source is in an on-state is compared by the first radiation sensor or controller with detected background radiation when the radiation source is in an off-state, the comparison used to remove background noise from a measurement of the optical property.

8. The additive manufacturing system of claim 1, wherein the controller is to cause a temperature regulating unit to heat or cool the portion based on the determined temperature.

9. The additive manufacturing system of claim 1 wherein the portion includes a solidified portion and an un-solidified portion, wherein determining the emissivity of the portion comprises:
determining a solidified emissivity of the solidified portion based on a measured optical property of the solidified portion; and
determining an un-solidified emissivity of the un-solidified portion based on a measured optical property of the un-solidified portion,
wherein the controller is to determine the temperature of the portion further based on relative sizes of the solidified portion and the non-solidified portion.

10. The additive manufacturing system of claim 1, wherein the controller comprises a processor and a non-transitory storage medium storing instructions executable on the processor.

11. The additive manufacturing system of claim 1, further comprising:
a storage medium to store a correlation between an emissivity of the build material and a value of the optical property of the build material,
wherein the controller is to determine the emissivity of the portion by accessing the correlation based on the measured optical property of the portion.

12. An additive manufacturing system comprising:
a radiation sensor to measure a radiation distribution emitted by ä portion of a layer of build material; and
a controller to:
determine an emissivity of the portion based on object design data representing a degree of intended solidification of the portion;
receive, from the radiation sensor, data representing the measured radiation distribution emitted by the portion; and
determine a temperature of the portion based on the determined emissivity and the measured radiation distribution emitted by the portion.

13. The additive manufacturing system of claim 12, wherein the controller is to cause a temperature regulating unit to heat or cool the portion based on the determined temperature.

14. The additive manufacturing system of claim 12, further comprising:
- a storage medium to store a correlation between an emissivity of the build material and a degree of solidification of the build material,
- wherein the controller is to determine the emissivity of the portion by accessing the correlation based on the degree of intended solidification of the portion represented by the object design data.

15. An additive manufacturing system comprising:
- a computer-readable medium to store a correlation between an emissivity of a build material and (1) a value of an optical property of the build material, or (2) a degree of solidification of the build material;
- a radiation sensor to measure a radiation distribution emitted by a portion of a layer of the build material; and
- a controller to:
    - receive, from the radiation sensor, data representing the measured radiation distribution emitted by the portion;
    - determine an emissivity of the portion based on the stored correlation that correlates a measured optical property of the portion or a degree of intended solidification of the portion to the emissivity of the portion; and
    - determine a temperature of the portion based on the determined emissivity and the measured radiation distribution emitted by the portion.

16. The additive manufacturing system of claim 15, wherein the correlation is based on measurements of the build material prior to generating a three-dimensional object by the additive manufacturing system.

17. The additive manufacturing system of claim 15, wherein the controller is to cause a temperature regulating unit to heat or cool the portion based on the determined temperature.

18. A non-transitory computer readable storage medium including executable instructions that, when executed cause a system to:
- receive, from a first radiation sensor, data representing a measured radiation distribution emitted by a portion of a layer of build material;
- receive, from a second radiation sensor, data representing a measured absorbance or gloss of the portion;
- determine an emissivity of the portion based on the measured absorbance or gloss of the portion; and
- determine a temperature of the portion based on the determined emissivity and the measured radiation distribution emitted by the portion.

19. The non-transitory computer readable storage medium of claim 18, wherein the instructions when executed cause the system to control a temperature regulating unit to heat or cool the portion based on the determined temperature.

* * * * *